United States Patent [19]
Bliss

[11] 3,739,855
[45] June 19, 1973

[54] ROCK PICKER

[76] Inventor: Jon P. Bliss, 12631 N.E. 9th Place, Bellevue, Wash. 98005

[22] Filed: June 3, 1971

[21] Appl. No.: 149,601

[52] U.S. Cl. ................................ 171/63, 171/89
[51] Int. Cl. ........................................ A01b 43/00
[58] Field of Search ............. 171/63, 89, 92, 129

[56] References Cited
UNITED STATES PATENTS
| | | | |
|---|---|---|---|
| 1,750,362 | 3/1930 | Sanders | 171/89 |
| 1,850,357 | 3/1932 | Pitcher | 171/89 |
| 2,856,013 | 10/1958 | Evans | 171/129 |

FOREIGN PATENTS OR APPLICATIONS
| | | | |
|---|---|---|---|
| 1,151,967 | 7/1963 | Germany | 171/63 |

*Primary Examiner*—Antonio F. Guida
*Attorney*—Kolisch, Hartwell & Dickinson

[57] ABSTRACT

Apparatus for picking rocks, or similar articles, from the ground including a frame supported for forward movement over the ground, and an elongated rotatable digging head having a plurality of laterally-spaced ground-penetrating teeth thereon. An elongated rotatable clearing head is mounted above the digging head and includes a plurality of laterally-spaced teeth which are positioned to sweep between the digging teeth to remove picked articles therefrom. The digging head is mounted for vertical movement on the frame and is adjustable between a lowered ground-penetrating position and a position raised above the ground. A conveyor adjacent the digging and clearing heads receives articles cleared from the digging head and moves them away from the head and to a crusher in the apparatus.

13 Claims, 3 Drawing Figures

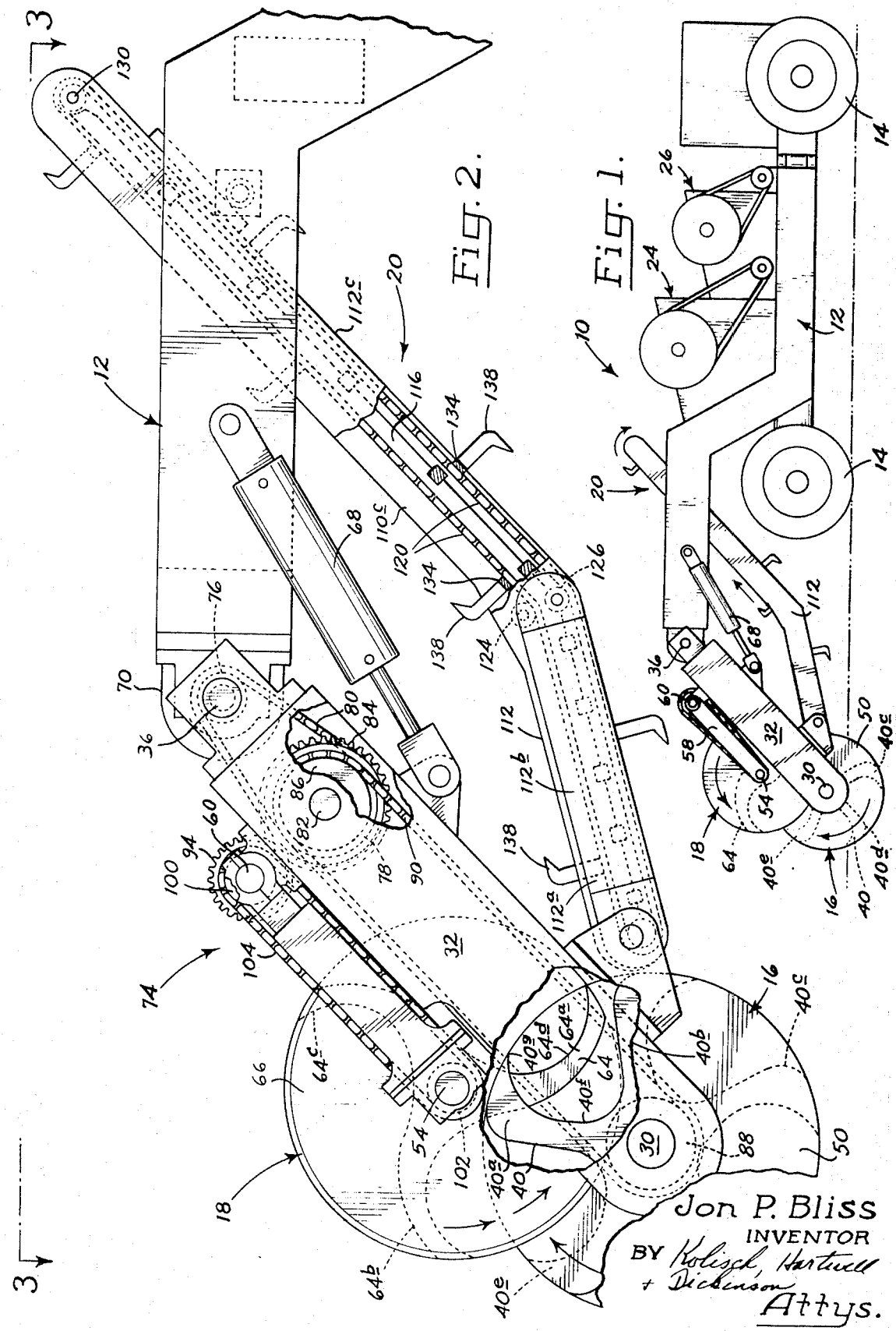

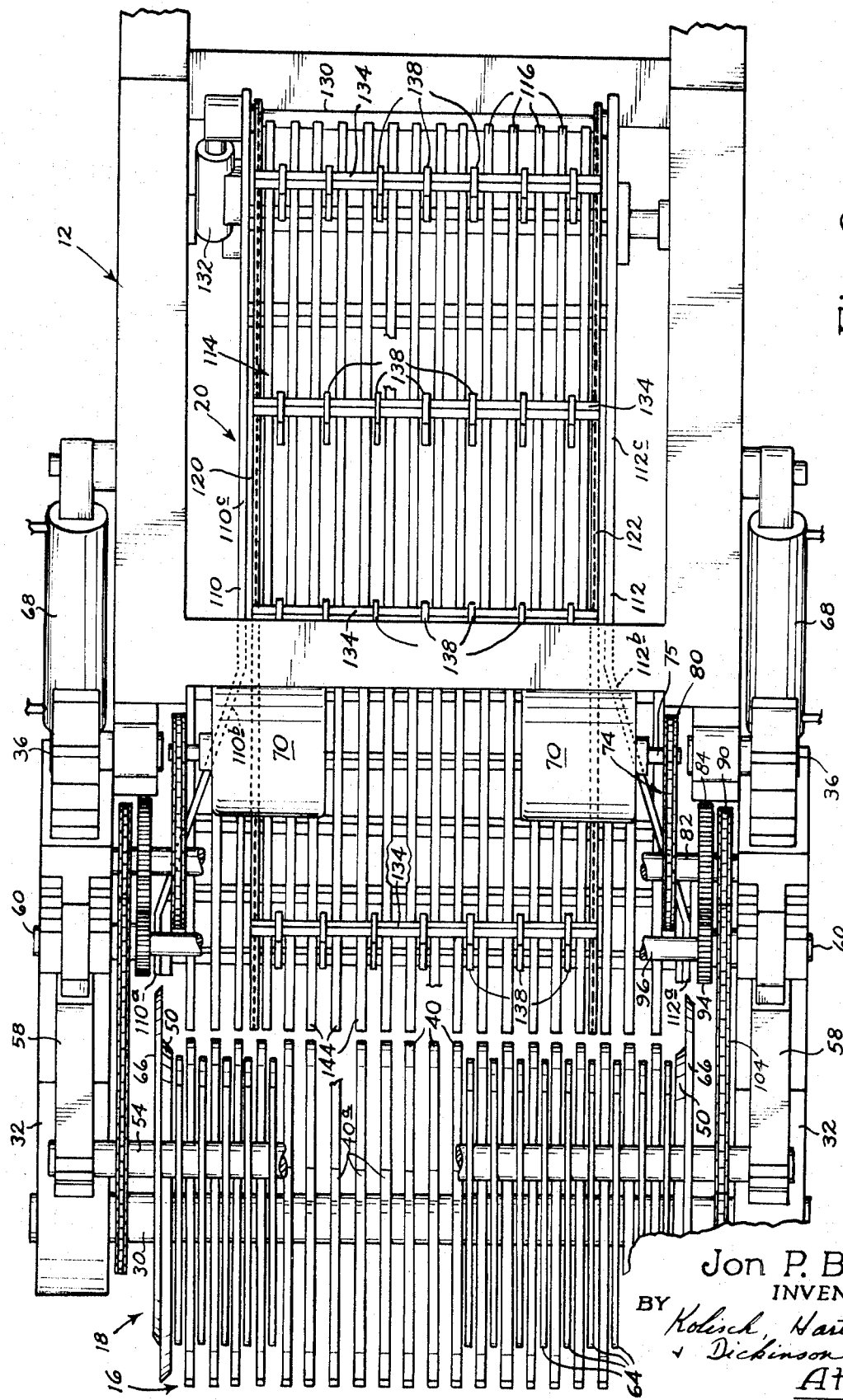

ROCK PICKER

This invention relates to apparatus for picking rocks or similar articles from the ground.

A general object of the invention is to provide novel apparatus which is operable rapidly and efficiently to pick rocks or similar articles from the ground.

More specifically, an object is to provide such novel apparatus which includes a rotatable digging head having a plurality of laterally-spaced, ground-penetrating digging teeth thereon for picking articles from the ground, and a rotatable clearing head having a plurality of laterally-spaced clearing teeth thereon which are positioned to sweep between the digging teeth to clear picked articles from the digging head.

Another object is to provide such novel apparatus in which the clearing head is yieldably biased toward the digging head, which permits the clearing head to be urged away from the digging head should an article be picked and raised by the digging head which is too large to be accommodated by the normal spacing between the two heads. Such mounting of the clearing head prevents large rocks from wedging between coacting teeth on the digging and clearing heads, which otherwise may cause damage to the apparatus.

Yet another object is to provide novel apparatus for picking rocks or similar articles from the ground, which includes a rotatable digging head having a plurality of laterally-spaced digging teeth thereon arranged in multiple, circumferentially spaced rows extending substantially parallel to the axis of the rotation of the head, and a clearing head adjacent the digging head and rotatable about an axis substantially paralleling the axis of the digging head, the clearing head having a plurality of laterally-spaced clearing teeth arranged in multiple, circumferentially-spaced rows extending substantially parallel to the axis of the clearing head. The clearing and digging heads in such apparatus are driven for rotation in opposite directions and the clearing teeth are positioned to pass between the digging teeth. The clearing head has fewer rows of teeth than does the digging head, and the two are driven for rotation in predetermined timed relationship, whereby successive rows of clearing teeth are moved through appropriate arcs between successive rows of digging teeth to sweep picked articles therefrom. With this construction the clearing teeth are rotated faster than the digging teeth and such produces a sweeping action to clear articles from the digging teeth.

Yet another object is to provide such novel apparatus in which the digging teeth are arcuate, having forwardly facing surfaces which are concave in the direction of rotation of the digging head. This permits articles picked by the digging teeth to be raised from the ground and over the central axis of the digging head. In such apparatus the clearing head is mounted above the digging head and the clearing teeth sweep picked articles from the digging head as such articles are raised above the central axis of the digging head.

These and other objects and advantages will become more fully apparent as the following description is read in conjunction with the drawings wherein:

FIG. 1 is a side view of apparatus constructed according to the invention;

FIG. 2 is an enlarged side view of a forward section of the apparatus with portions broken away; and FIG. 3 is a top plan view of the forward section of the apparatus shown in FIG. 2, with portions broken away.

Referring now to the drawings, and first more specifically to FIG. 1, at 10 is indicated generally apparatus constructed according to an embodiment of the invention for picking rocks, or similar articles, from the ground. In general terms, the apparatus includes a main frame 12 supported for powered movement over the ground by wheels 14. Mounted on the forward end of the frame, at the left in FIG. 1, is a rotatable digging head 16 operable to pick rocks or similar articles from the ground, a rotatable clearing head 18 for clearing picked articles from digging head 16, and a conveyor 20 for receiving articles cleared from the digging head and for conveying them upwardly and rearwardly away from the digging head. Conveyor 20 is operable to carry rocks received from the digging head to a primary crusher 24 which is operable to break the rocks into smaller sections, from which they are then passed to a secondary crusher 26 which is operable to break them into still finer sections. The crushed rock then may be discharged onto the ground in its reduced state or it may be transferred to another vehicle for transporting elsewhere.

Describing now digging head 16, and referring specifically to the top plan view of FIG. 3, wherein a central portion of clearing head 18 has been broken away, the digging head includes an elongated central shaft 30 which extends transversely of the apparatus. Opposite ends of shaft 30 are journaled for rotation in the forward ends of a pair of laterally spaced elongated arms 32. The rear ends of arms 32 are journaled at points 36 on the forward end of frame 12.

A plurality of identical digging elements 40 are secured to shaft 30 in laterally spaced relation. Referring to FIGS. 1 and 2, each digging element 40 has five digging teeth thereon, indicated generally at 40a, 40b, 40c, 40d, and 40e. Each tooth, and referring specifically to tooth 40a illustrated in FIG. 2, is arcuate, having a concave surface 40f facing in one direction and terminating at the outer end of the tooth in a digging point 40g. The teeth are substantially equally spaced circumferentially about shaft 30. The digging elements on shaft 30 are substantially aligned with each other in a direction extending axially of the shaft, with the digging teeth thereon thus being disposed in a plurality of circumferentially spaced rows extending substantially axially of the digging head. A pair of laterally spaced disks 50 are secured to shaft 30 adjacent its opposite ends and outwardly from opposite ends of digging elements 40.

Clearing head 18, above digging head 16, includes an elongated shaft 54 journaled for rotation at its opposite ends at the forward set of ends of a pair of laterally spaced, elongated arms 58. The rear ends of arms 58 are journaled at points 60 on arms 32. A plurality of identical, laterally spaced clearing elements 64 are secured to shaft 54 and are so positioned on the shaft that they are out of alignment with digging elements 40 when viewed from above, as seen in FIG. 3.

Referring again to FIG. 2, each clearing element 64 includes three clearing teeth 64a, 64b, 64c. The teeth on each clearing element have equal length. Each tooth, and referring specifically to tooth 64a, is arcuate, having a concave forward face 64d. The clearing elements are substantially aligned with each other in a direction extending axially of the shaft whereby the teeth on the elements are aligned in circumferentially spaced rows extending substantially axially of shaft 54.

Secured to shaft 54 adjacent its opposite ends are a pair of laterally spaced disks 66. Disks 66 are spaced apart a slightly greater distance than the distance between the outer sides of disks 50 on the digging head and coact with disks 50 to maintain proper lateral alignment of the digging and clearing heads. Should one of the heads be urged to move laterally, disks 66, 50 at one end of the heads would come into contact to prevent lateral relative movement between the heads. This then prevents the heads from being moved into position where teeth 64 on the clearing head would be in vertical alignment with teeth 40 on the digging head.

A pair of hydraulic rams 68 are pivotally connected adjacent one set of their ends to frame 12, and adjacent their other set of ends to arms 32. Previously-described journal points 36 pivotally mount arms 32 for swinging movement relative to frame 12, whereby the digging head may be raised or lowered relative to the ground. Rams 68 on contraction lower arms 32, and thus digging head 16, to a lowered, ground-penetrating position as illustrated in FIG. 1, wherein the teeth of the digging head, upon rotation, penetrate the ground for picking rocks or other articles from below the surface. Extension of rams 68 swings arms 32 upwardly to raise the digging head above ground level. The rams and arms are actuatable to position the digging head in multiple adjusted positions between its raised and lowered positions and to secure the digging head in any of such adjusted positions.

A pair of laterally-spaced motors 70 are mounted adjacent arms 32, with one motor adjacent journal connection 36 for one of arms 32 and the other motor adjacent journal connection 36 for the other arm 32. The shaft 75 of each motor 70 is substantially aligned with the axis of rotation for its associated arm 32 at journal point 36.

Motors 70 are drivingly connected to opposite sets of ends of the digging and clearing heads through drive trains, such as that indicated generally at 74 for one of the motors. Drive train 74 includes a drive sprocket 76 secured to shaft 75, a driven sprocket 78 spaced forwardly therefrom, and a drive chain 80 trained over sprockets 76, 78. Sprocket 78 is secured to a shaft 82 which also carries a spur gear 84 and another sprocket 86. A sprocket 88 shown in dashed outline in FIG. 2, is secured to shaft 30 of the digging head and a drive chain 90 is trained around sprockets 86, 88. Motor 70 thus is drivingly connected to the digging head through drive chains 80, 90 and sprockets 76, 78, 86, and 88.

The teeth of spur gear 84 engage the teeth of another spur gear 94. Gear 94 is secured to a rotatable shaft 96 substantially aligned with the axis of rotation for arm 58 at journal point 60. Also secured to shaft 96 is a sprocket 100. A sprocket 102 (shown in dashed outline in FIG. 2) is secured to shaft 54 of the clearing head and a drive chain 104 is trained around sprockets 100, 102. Motor 70 thus is drivingly connected to the clearing head through drive chains 80, 104, sprockets 76, 78, 100, 102, and gears 84, 94.

The drive train just described is operable, on actuation of motor 70, to produce rotation of the digging head and clearing head in opposite directions relative to each other. The digging head rotates in a clockwise direction as viewed in FIGS. 1 and 2, whereby its digging teeth on passing under shaft 30 move forwardly of the apparatus. The clearing head rotates in a counterclockwise direction as viewed in FIGS. 1 and 2, whereby its teeth pass in an arc rearwardly of the apparatus on moving under shaft 54. With the previously described disposition of the clearing head relative to the digging head, the teeth of clearing elements 64 pass freely between the teeth of digging element 40.

The sprockets and gears in drive train 74 have such dimensions that the digging and clearing heads are rotated in a predetermined, substantially constant, timed relationship, with the clearing head being rotated more rapidly than the digging head. More specifically, the relative rotational speeds of the clearing and digging heads are in a five to three ratio. Thus each successive row of clearing teeth on the clearing head coacts with each successive row of digging teeth on the digging head, whereby they serve to sweep articles from the trailing edge of a row of digging teeth, as will be described in greater detail below.

Describing now conveyor 20 mounted rearwardly of the digging head, it includes a pair of elongated laterally spaced side members 110, 112 which support a grate structure 114 therebetween. Side members 110, 112 have forward portions 110a, 112a, which are spaced apart laterally substantially the width of the clearing and digging heads; portions 110b, 112b which converge on progressing rearwardly; and substantially parallel portions 110c, 112c which are more closely spaced. The grate structure includes a plurality of elongated, laterally spaced, parallel bars 116 which, when viewed from above, extend parallel to portions 110c, 112c of the side members. The upper surfaces of bars 116 are substantially aligned with each other at a level below the tops of side members 110, 112. As is best seen in FIG. 2, the forward portions of side members 110, 112 and bars 116 are inclined at a low angle as they progress rearwardly from the digging head, and then are inclined at a much steeper angle farther from the digging head.

Mounted inwardly of and adjacent side members 110, 112, are a pair of laterally-spaced endless drive chains 120, 122. These chains are trained over spaced sprockets adjacent the forward and rear ends of bars 116 of the grate structure. The chains have upper reaches extending substantially parallel to, but slightly below, the upper surfaces of bars 116, and lower reaches paralleling and adjacent the lower sides of bars 116, as is best illustrated in FIG. 2. A pair of vertically spaced guide sprockets, such as those seen in dashed outline in FIG. 2, at 124, 126 train intermediate portions of a chain along a side of the grate structure. The sprockets over which chains 120, 122 are trained at the rear end of the grate structure are secured to a drive shaft 130 extending laterally of the apparatus. This drive shaft is operatively connected to a motor 132 which is accuatable to drive the chains, with the upper reaches of the chains moving rearwardly of the apparatus.

A plurality of spaced, elongated bars 134 extend between and are secured at their opposite sets of ends to chains 120, 122. Bars 134 are mounted for sliding movement along the tops of bars 116 of the grate structure upon movement of chains 120, 122. Secured to each of bars 134 are a plurality of laterally spaced fingers 138 which project outwardly from the bar and away from the grate structure.

Disposed laterally outwardly from opposite sides of chains 120, 122 and adjacent portions 110a, 110b, and 112a, 112b of the side members are a plurality of endless power-driven conveyor belts 144. The upper reaches of belts 144 lie in a substantially common plane with the upper surfaces of grate bars 116.

Describing now the operation of the apparatus to pick rocks or other articles from the ground, ram 68 is contracted to lower the digging head into the ground-penetrating position shown in FIG. 1. On rotation, the digging teeth will dig into the ground. As the apparatus is driven forwardly over the ground and the digging head is rotated, the digging teeth pick rocks, or other articles, from the ground and carry them up and over the shaft of the digging head. The arcuate configuration of the teeth on the digging head serves to hold the rocks in the teeth as the digging head is rotated. With the digging elements being spaced apart laterally in the digging head, dirt and smaller articles will fall between the teeth and back to the ground.

As the picked articles are passed over the shaft of the digging head they are swept from the digging teeth by operation of the clearing head. Explaining further, when an article is carried over the digging head shaft by a tooth, such as tooth 40a, it will fall onto the trailing edge of the preceeding tooth, 40b. The clearing head is rotated in timed relationship with the digging head, whereby successive rows of clearing teeth coact with successive rows of digging teeth, and the clearing teeth are rotated faster than the digging teeth. A row of clearing teeth, such as that indicated at 64a, will pass between a row of digging teeth, such as that indicated at 40a, in an arc adjacent the trailing edge of digging teeth 40b to sweep articles carried in the region between digging teeth 40a, 40b from the digging head.

Articles cleared from the digging head are discharged onto the forward end of the grate structure of conveyor 20. As one of bars 134 with its associated fingers 138 is moved by the chains over the forward end of the conveyor, it engages articles discharged onto the grate structure, and slides them up the grate bars and over the rearwardmost end of the conveyor to dump them into crusher 24. Articles discharged onto belts 144 outside chains 120, 122 are conveyed up the conveyor by movement of the belts and are moved laterally onto the grate structure by sliding contact with converging portions 110b, 112b of the side members. As the articles are moved up the conveyor, dirt and other small matter falls through the grate structure to the ground.

The depth of penetration of the digging teeth may be adjusted as desired by selective adjustment of rams 68 which raise and lower arms 32. The journal mountings 60 for the rear ends of arms 58 permit the clearing head to swing upwardly and away from the digging head. The clearing head, however, normally is yieldably biased downwardly by gravity toward the digging head. Should a rock which is too large to be accommodated by normal coaction of the clearing teeth and the digging teeth be picked up by the digging teeth, the clearing head may raise as the clearing teeth engage the top of the rock. The clearing head then merely rides over the top of the rock. Were the clearing head not able to ride over a rock in this manner there is a possibility that such would wedge between the teeth and cause substantial damage to the apparatus.

By use of such novel apparatus large land areas may be prepared for agriculture. Explaining further, certain types of crops, for example potatoes and sugar beets, require soil which is relatively free of rocks. This apparatus, provides a rapid and efficient means for removing rocks from the soil, whereby the land may be made usable.

While a specific embodiment of the invention has been described herein, it should be apparent to those skilled in the art that variations and modifications are possible without departing from the spirit of the invention.

I claim:

1. Apparatus for picking rocks or similar articles from the ground comprising:

A main frame supported for forward movement over the ground,

A rotatable digging head including an elongated central shaft disposed with its central axis extending transversely of the frame and a plurality of elongated digging teeth secured to and projecting radially outwardly from the shaft, said teeth being spaced laterally from each other in a direction extending axially of said shaft, means mounting said digging head for vertical movement to different adjusted positions relative to said frame between a lowered ground-penetrating position, wherein outer ends of the digging teeth will penetrate the ground on rotation of the digging head, and a raised position above the ground, power-operated means for moving said digging head between its different adjusted positions and for securing said digging head in one of said selected positions, a rotatable clearing head including an elongated shaft disposed with its central axis extending transversely of the frame and substantially paralleling the axis of the shaft of the digging head and a plurality of elongated clearing teeth secured to and projecting radially outwardly from the shaft, said clearing teeth being spaced laterally from each other in a direction extending axially of the shaft and having such width and spacing that they may move freely between said digging teeth on relative rotation of said heads, means mounting said clearing head above said digging head for movement toward and away from said digging head and yieldably biasing said clearing head into a position where the clearing teeth on being rotated pass between the digging teeth, said clearing head being adapted to move away from said digging head when an unyielding object is interposed therebetween in such a manner as to produce a force urging the clearing head away from the digging head, and driving means for rotating said heads in opposite directions with the digging teeth moving forwardly of the apparatus on passing under the shaft of the digging head to pick articles and raise them from the ground and the clearing teeth moving rearwardly of the apparatus on passing under the shaft of the clearing head to remove picked articles from the digging teeth as they are raised by the digging teeth over the shaft of the digging head.

2. The apparatus of claim 1, wherein said driving means comprises means for rotating the digging and clearing heads in a predetermined timed relationship, with a clearing tooth on being rotated below the shaft of the clearing head passing through an arc adjacent the trailing edge of a digging tooth rotated over the shaft of the digging head.

3. The apparatus of claim 2, wherein the clearing teeth are disposed in a plurality of circumferentially spaced rows extending substantially axially of the clearing head, the digging teeth are disposed in a plurality of circumferentially spaced rows extending substantially axially of the digging head, said digging head having a greater number or rows of teeth than said clearing head, and said driving means is operable to rotate the clearing head faster than said digging head so that each successive row of clearing teeth coacts with each successive row of digging teeth to remove picked articles therefrom.

4. The apparatus of claim 3, wherein a digging tooth is arcuate, having a concave surface facing in the direction of rotation for the digging head.

5. Apparatus for picking rocks or similar articles from the ground comprising:

a main frame supported for forward movement over the ground, a rotatable digging head supported on said main frame adjacent the ground including an elongated shaft disposed with its central axis extending transversely of the frame and a plurality of elongated digging teeth secured to and projecting radially outwardly from the shaft, said teeth being spaced laterally from each other in a direction extending axially of said shaft, a rotatable clearing head above said digging head including an elongated shaft disposed with its central axis extending transversely of the frame and substantially parallel to the shaft of the digging head and a plurality of elongated clearing teeth secured to and projecting radially outwardly from the shaft, said clearing teeth being spaced laterally from each other in a direction extending axially of the shaft and having such width and spacing that they may move freely between said digging teeth on relative rotation on said heads, means mounting said clearing head on said main frame for movement toward and away from the digging head and yieldably biasing the clearing head into a position where the clearing teeth on being rotated pass between the digging teeth, said clearing head being adapted to move away from said digging head when an unyielding object is interposed therebetween in such a manner as to produce a force urging the clearing head away from the digging head, and driving means for rotating said heads in opposite directions with the digging teeth moving forwardly of the apparatus on passing under the shaft of the digging head to pick articles and raise them from the ground and the clearing teeth moving rearwardly of the apparatus on passing under the shaft of the clearing head to remove picked articles from the digging teeth as they are raised by the digging teeth over the shaft of the digging head.

6. The apparatus of claim 5, which further comprises means mounting said digging head for vertical movement to different adjusted positions relative to the frame between a lowered ground-penetrating position, wherein outer ends of the digging teeth will penetrate the ground on rotation of the digging head, and a raised position above the ground, and power-operated means for moving said digging head between its said different adjusted positions and for securing said digging head in one of said adjusted positions.

7. The apparatus of claim 6, wherein said means for moving said digging head and securing it in a selected position comprises a double-acting ram.

8. The apparatus of claim 5, which further comprises conveyor means mounted on said frame rearwardly of said digging and clearing heads onto which picked articles may be discharged from the digging head, operable to move such articles away from said heads, said conveyor means including an open grate structure having an upper surface for supporting articles moved away from said heads, spaced conveyor elements projecting upwardly from said upper surface of the grate structure and mounted for movement over said grate structure, and powered means connected to said conveyor elements for moving them over said grate structure in a direction away from said heads.

9. The apparatus of claim 8, wherein a conveyor element comprises a plurality of elongated, upwardly projecting, spaced fingers.

10. The apparatus of claim 5, wherein said driving means comprises means for rotating the digging and clearing heads in a predetermined timed relationship, with a clearing tooth on being rotated below the shaft of the clearing head passing through an arc adjacent the trailing edge of a digging tooth rotated over the shaft of the digging head to remove picked articles from the digging tooth which have been carried over the shaft of the digging head.

11. The apparatus of claim 10, wherein the clearing teeth are disposed in a plurality of circumferentially spaced rows extending substantially axially of the clearing head, the digging teeth are disposed in a plurality of circumferentially spaced rows extending substantially axially of the digging head, said digging head having a greater number of rows of teeth than said clearing head, and said driving means is operable to rotate the clearing head faster than said digging head so that each successive row of clearing teeth coacts with each successive row of digging teeth to remove picked articles therefrom.

12. The apparatus of claim 5, wherein a clearing tooth is arcuate, having a concave surface facing in the direction of rotation for the clearing head.

13. Apparatus for picking rocks or similar articles from the ground comprising:

a main frame supported for forward movement over the ground, a rotatable digging head supported on said main frame adjacent the ground including an elongated shaft disposed with its central axis extending transversely of the frame and a plurality of elongated digging teeth secured to and projecting radially outwardly from the shaft, said teeth being spaced laterally from each other in a direction extending axially of said shaft and disposed in a plurality of circumferentially spaced rows extending substantially axially of the digging head, a rotatable clearing head supported on said main frame above said digging head including an elongated shaft disposed with its central axis extending transversely of the frame and substantially parallel to the shaft of the digging head and a plurality of elongated clearing teeth secured to and projecting radially outwardly from the shaft, said clearing teeth being spaced laterally from each other in a direction extending axially of the shaft and having such width and spacing that they may move freely between said digging teeth on relative rotation of said heads and disposed in a plurality of circumferentially spaced rows extending substantially axially of the clearing head, said clearing head having a lesser number of rows of teeth than said digging head, and driving means operatively connected to said heads for rotating the same in opposite directions in a predetermined timed relationship, with each row of digging teeth moving forwardly of the apparatus on passing under the shaft of the digging head to pick articles and raise them from the ground and each row of clearing teeth moving rearwardly of the apparatus on passing under the shaft of the clearing head, with said clearing head rotating faster than said digging head and each successive row of clearing teeth coacting with each successive row of digging teeth and passing through an arc adjacent the trailing edge of said row of digging teeth to remove picked articles from the digging teeth as such are raised over the shaft of the digging head, said clearing head being adapted to move away from said digging head when an unyielding object is interposed therebetween in such a manner as to produce a force urging the clearing head away from the digging head.

* * * * *